(12) United States Patent
Nishiguchi et al.

(10) Patent No.: US 10,429,234 B2
(45) Date of Patent: Oct. 1, 2019

(54) DISTRIBUTED FIBER OPTIC ACOUSTIC DETECTION DEVICE

(71) Applicant: NEUBREX CO., LTD., Chuo-ku, Kobe-shi, Hyogo (JP)

(72) Inventors: Kenichi Nishiguchi, Kobe (JP); Kinzo Kishida, Kobe (JP); Che-Hsien Li, Kobe (JP)

(73) Assignee: NEUBREX CO., LTD., Kobe-Shi, Hyogo (JP)

( * ) Notice: Subject to any disclaimer, the term of this patent is extended or adjusted under 35 U.S.C. 154(b) by 41 days.

(21) Appl. No.: 15/542,588

(22) PCT Filed: Jan. 21, 2015

(86) PCT No.: PCT/JP2015/051465
§ 371 (c)(1),
(2) Date: Jul. 10, 2017

(87) PCT Pub. No.: WO2016/117044
PCT Pub. Date: Jul. 28, 2016

(65) Prior Publication Data
US 2017/0356793 A1 Dec. 14, 2017

(51) Int. Cl.
*G01H 9/00* (2006.01)
*G01V 1/00* (2006.01)
*G01V 1/42* (2006.01)
*G01V 1/22* (2006.01)

(52) U.S. Cl.
CPC ............ *G01H 9/006* (2013.01); *G01H 9/002* (2013.01); *G01V 1/001* (2013.01); *G01V 1/226* (2013.01); *G01V 1/42* (2013.01)

(58) Field of Classification Search
CPC ........ G01H 9/006; G01H 9/002; G01H 9/004; G01H 9/008; G01V 1/001; G01V 1/226; G01V 1/42; G01N 29/24
USPC ..................................... 73/643, 655
See application file for complete search history.

(56) References Cited

U.S. PATENT DOCUMENTS

| 5,194,847 A | 3/1993 | Taylor et al. |
| 2007/0041020 A1* | 2/2007 | Hall .................. G01D 5/35303 356/484 |
| 2012/0060615 A1 | 3/2012 | Farhadiroushan et al. |
| 2012/0162639 A1 | 6/2012 | Farhadiroushan et al. |
| 2012/0188533 A1 | 7/2012 | Crickmore et al. |

(Continued)

FOREIGN PATENT DOCUMENTS

| JP | 5-45209 A | 2/1993 |
| JP | 2003-279404 A | 10/2003 |

(Continued)

OTHER PUBLICATIONS

International Search Report (PCT/ISA/210) dated Apr. 14, 2015, by the Japanese Patent Office as the International Searching Authority for International Application No. PCT/JP2015/051465.

(Continued)

*Primary Examiner* — Lisa M Caputo
*Assistant Examiner* — Rose M Miller
(74) *Attorney, Agent, or Firm* — Buchanan Ingersoll & Rooney PC

(57) ABSTRACT

A distributed fiber optic acoustic detection device employs a novel distributed acoustic detection method using a phase noise cancelling distributed acoustic sensing (PNC-DAS) technique.

6 Claims, 19 Drawing Sheets

(56) References Cited

U.S. PATENT DOCUMENTS

| | | | |
|---|---|---|---|
| 2014/0176937 A1* | 6/2014 | Liu | G01D 5/35329 |
| | | | 356/73.1 |
| 2014/0255023 A1 | 9/2014 | Kishida et al. | |
| 2015/0192436 A1 | 7/2015 | Farhadiroushan et al. | |
| 2016/0169712 A1 | 6/2016 | Farhadiroushan et al. | |
| 2017/0082464 A1 | 3/2017 | Farhadiroushan et al. | |
| 2017/0082465 A1 | 3/2017 | Farhadiroushan et al. | |
| 2017/0082484 A1 | 3/2017 | Farhadiroushan et al. | |
| 2017/0138785 A1* | 5/2017 | Tadakuma | G01D 5/353 |

FOREIGN PATENT DOCUMENTS

| | | |
|---|---|---|
| JP | 2013-506828 A | 2/2013 |
| WO | WO 2010/136810 A2 | 12/2010 |
| WO | WO 2013/051196 A1 | 4/2013 |

OTHER PUBLICATIONS

Anne Fischer, "Applying DAS in Oil & Gas Operations", Novus Light Technologies Today, [online], Oct. 8, 2012, 5 pages.
Peter Gysel et al., "Statistical Properties of Rayleigh Backscattering in Single-Mode Fibers", Journal of Lightwave Technology, vol. 8, No. 4, 1990, pp. 561-567.

* cited by examiner ent that is used as an intrusion sensor, in which laser light is injected into an optical fiber to detect acoustic waves reaching each longitudinal locations along the optical fiber (see, for example, Patent Document 1). The apparatus performs the intrusion sensing by detecting, at each position along the optical fiber, intensity variations of the Rayleigh backscattered light (hereinafter referred to as Rayleigh scattered light) responsive to pulse light from the laser light source.

DISTRIBUTED FIBER OPTIC ACOUSTIC DETECTION DEVICE

TECHNICAL FIELD

The present invention relates to a distributed fiber optic acoustic detection device that uses an optical fiber as a sensor for detecting an acoustic wave reaching each of longitudinal positions with high sensitivity and high accuracy by eliminating phase noise of the laser light.

BACKGROUND ART

There is an apparatus that is used as an intrusion sensor, in which laser light is injected into an optical fiber to detect acoustic waves reaching each longitudinal locations along the optical fiber (see, for example, Patent Document 1). The apparatus performs the intrusion sensing by detecting, at each position along the optical fiber, intensity variations of the Rayleigh backscattered light (hereinafter referred to as Rayleigh scattered light) responsive to pulse light from the laser light source.

A method using distributed acoustic sensing, which may be abbreviated as "DAS" in some cases below, has been traditionally known as a technique for the above-mentioned intrusion sensing or for sensing oil and gas wells (see, for example, Non-Patent Document 1). The technique utilizes change in intensity of Rayleigh scattered light as mentioned above, and is called optical intensity-based DAS referred to as "DAS-I" in abbreviation. Since DAS-I utilizes intensity oscillation of Rayleigh scattered light due to an acoustic wave, the signal processing is simple in itself but its sensitivity widely depends on positions, thus limiting the acoustic detection performance. Meanwhile, another technique that utilizes change in phase of Rayleigh scattered light has been recently put into practical use, which is called optical phase-based DAS referred to as "DAS-P" in abbreviation. In DAS-P, since a spatial integral of an acoustic wave represents the phase of Rayleigh scattered light, a spatial differentiation of the phase is required. Moreover, the phase is measured in a wrapped form from the nature of phase; hence, unwrapping (representing a phase in a continuous form) is also required. For that reason, DAS-P, although the signal processing therefor is more complicated than that for DAS-I, has an advantage of being able to reproduce the acoustic waveform accurately.

Although any of the above distributed acoustic detection techniques is used, two kinds of noise: phase noise in the laser light and observation noise in the receiver, significantly affect the acoustic detection performance, which are factors degrading the detection performance. Moreover, an influence of polarization also needs to be taken into account. Among these factors, the influence of observation noise can be suppressed by increasing the signal-to-noise (SN) ratio of the signal using a pulse compression technique (see, for example, Patent Document 2). Furthermore, the influence of polarization can be suppressed by detection such as using a polarization diversity heterodyne detector.

PRIOR ART DOCUMENT

Patent Document

Patent Document 1: U.S. Pat. No. 5,194,847 A;
Patent Document 2: WO2013/051196 A1

Patent Document 3: WO2010/136810 A1

Non-Patent Document

Non-Patent Document 1: Anne Fischer, "Applying DAS in Oil & Gas Operations", Novus Light Technologies Today, http://www.novuslight.com/applying-das-in-oil-gas-operations-N320.html Non-Patent Document 2: "Statistical properties of Rayleigh backscattering in single-mode fibers", Journal of Lightwave Technology, vol. 8, No. 4, 1990, pp. 561-567

SUMMARY OF THE INVENTION

Problem that the Invention is to Solve

Traditionally, the influence of phase noise of the laser light has been coped with by using a special laser light source. More specifically, in conventional distributed acoustic measurements, a frequency linewidth (half-value width) of 10 kHz or less is typically prerequisite for a laser light source usable for the measurement (see, for example, Patent Document 1). This is because a frequency linewidth of 10 kHz or more has not ever allowed for acoustic detection. Thus, there has been a restriction on a conventional laser light source that is usable for acoustic measurement.

Such a conventional distributed acoustic measurement using a laser light source has encountered the following problems. The first is that an expensive laser light source is needed because a laser light source having a frequency half-value width of 10 kHz or less is a special one having an external cavity type. The second is that such an external cavity type laser light source is difficult to drive and control, for example because oscillation frequency of the laser may not be continuously changed owing to occurrence of frequency hopping when controlling the oscillation frequency of the laser. The third is that if a laser light source having such a narrow linewidth is intended to be shared in other optical fiber sensing such as using Brillouin optical time domain reflectometry (BOTDR) and tunable wavelength coherent optical time domain reflectometry (TW-COTDR), at least two kinds of laser light sources are needed because the narrow-linewidth laser light source is limited to DAS applications and cannot be shared in the other optical fiber sensing.

The present invention is made in light of the foregoing problems and aimed at providing a distributed fiber optic acoustic detection device that employs a new distributed acoustic detection method using laser light phase noise cancellation in order to enable acoustic detection with an ordinal laser light source.

Means for Solving the Problems

A distributed fiber optic acoustic detection device according to the present invention measures a distribution state of an acoustic wave by utilizing backscattered light disturbance due to strain of an optical fiber caused by the acoustic wave, and the distributed fiber optic acoustic detection device includes: a laser light source; a pulse generator for shaping laser light from the laser light source into an optical pulse, to inject into an optical fiber the optical pulse as a prove optical pulse for acoustic detection; a delay circuit for delaying the laser light to be injected into the pulse generator for the pulse generator to inject a delayed optical pulse as a replica optical pulse of the prove optical pulse for acoustic detection; a switching circuit for switching injection of the laser light into the pulse generator between directly and via the delay circuit; a detector for detecting Rayleigh backscattered light returning to an input end of the optical fiber after backscattered in the optical fiber, to extract an intermediate frequency signal from the detected signal; and a signal processor for processing the intermediate frequency signal extracted by the detector to convert the processed signal into a baseband signal, wherein during acoustic measurement, the prove optical pulse and the replica optical pulse are repeatedly injected one after another as an odd-numbered prove pulse and an even-numbered prove pulse, respectively, into the optical fiber at constant time intervals by the switching action of the switching circuit, and the signal processor processes the intermediate signal that is obtained by subtracting a Rayleigh backscattered signal responsive to an odd-numbered optical pulse from a Rayleigh backscattered signal responsive to the next even-numbered optical pulse.

Advantage of the Invention

According to the present invention, an acoustic detection can be performed using an ordinal laser light source without using a laser light source having a frequency half bandwidth of 10 kHz or less. This facilitates drive and control of the laser light. Moreover, this brings about a significant effect of sharing other optical fiber sensing such as BOTDR or TW-COTDR.

EMBODIMENTS FOR CARRYING OUT THE INVENTION

Embodiment 1

Figure 1:
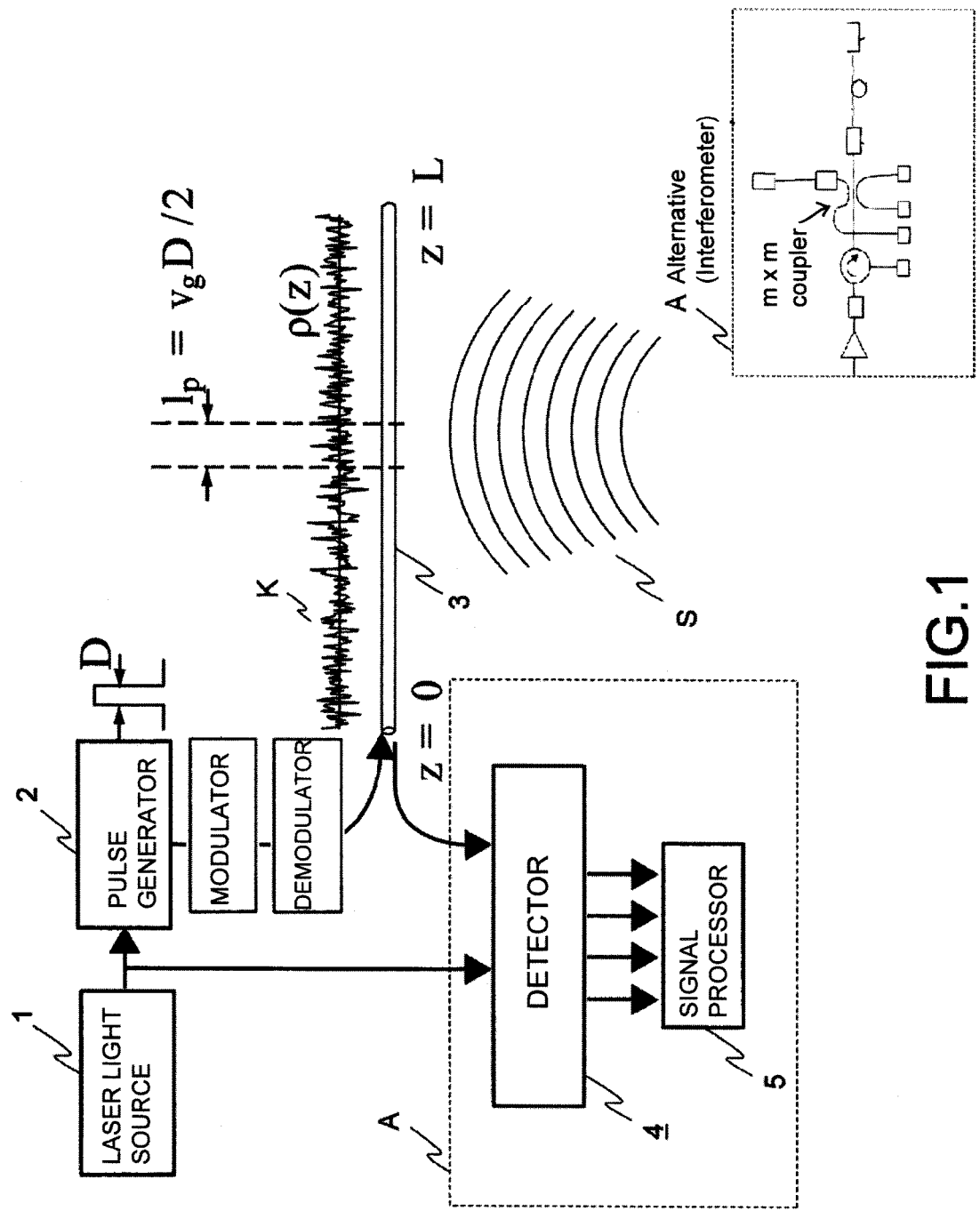
FIG. 1 is a diagram showing an example of a basic configuration of a device that is prerequisite for a distributed fiber optic acoustic detection device according to Embodiment 1 of the present invention.
Figure 2A:
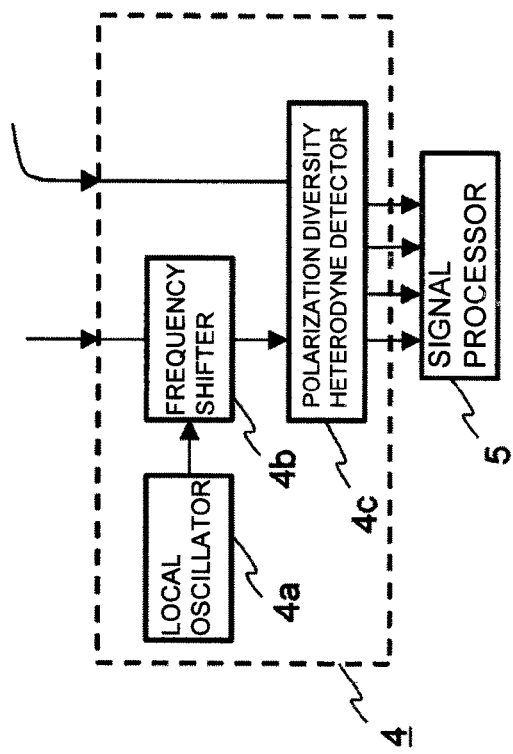
FIGS. 2A and 2B show enlarged diagrams of the part A of FIG. 1.
Figure 2B:
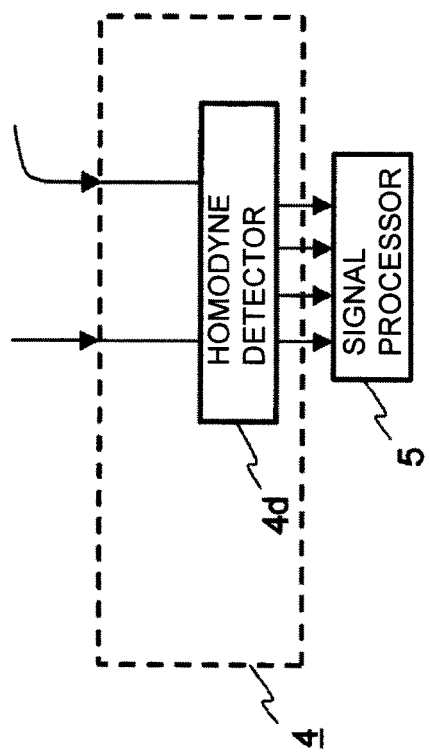

Firstly, a distributed fiber optic acoustic detection method, which is a basis for Embodiment 1 of the present invention, is generally described with reference to the drawings. FIG. 1 is a diagram showing an example of a configuration of a typical distributed fiber optic acoustic detection device. FIGS. 2A and 2B show enlarged diagrams of the part A of FIG. 1: FIG. 2A is a diagram for detection using a heterodyne detection method and FIG. 2B is a diagram for detection using a homodyne detection method. In these diagrams, a laser light emitted from a laser light source 1 is shaped by a pulse generator 2 into a pulse having a time width D as schematically shown on the right of the pulse generator 2 in the figure, for the pulse to be injected into an optical fiber 3 from the input end thereof, which is a position indicated by z=0 in the figure. In addition, defining the longitudinal direction of the optical fiber as a z direction and the length of the optical fiber in the z direction as L, the position of the other end of the optical fiber is indicated by z=L. The injected pulse is Rayleigh-scattered in the optical fiber 3, and the Rayleigh scattered light returns to the input end of the optical fiber 3. The return Rayleigh scattered light is detected by a detector 4, and an intermediate signal, i.e., an intermediate frequency (IF) signal is extracted therefrom. The detection method usable in detecting with the detector 4 is roughly categorized into two types as mentioned above. One is the heterodyne detection method, in which a local oscillator 4a and a frequency shifter 4b are used as components of the detector 4 as shown in FIG. 2A and the Rayleigh scattered light is heterodyne-detected with a polarization diversity heterodyne detector 4c using a reference light frequency-shifted by these constituent components from the laser light of the laser light source 1, and then the IF signal, the intermediate signal is extracted. The IF signal is processed by a signal processor 5, thereby to be converted to a baseband signal. At the same time, a polarization component is also extracted by combining the polarization diversity reception. On the other hand, the homodyne detection method shown in FIG. 2B is also usable as another detection method. In this method, the baseband signal is extracted after the detection not using the local oscillator 4a and the frequency shifter 4b shown in FIG. 2A but using only a homodyne detector 4d.

In order to measure an acoustic wave with the device, prove pulses for measuring the acoustic wave are injected into the optical fiber 3 with a sampling frequency twice or more the bandwidth of the acoustic wave, to measure Rayleigh scatted light disturbance caused by strain produced in the optical fiber 3 due to the acoustic wave indicated by symbol Sin FIG. 1. Thus, a typical distributed acoustic detection device has the configuration shown in FIG. 1 excepting the optical fiber 3. In addition, Rayleigh scattered light is repeatedly measured to obtain an average value of Rayleigh scattered signals because subtraction of the averaged value from a measured Rayleigh scattered signal is needed to be performed in the above-described signal processing.

In the above Patent Document 1, intensity of the Rayleigh scattered light returning to the input end of the optical fiber is measured as a function of time elapsed after injection of the optical pulse. This measurement is performed while repeatedly injecting the optical pulse into the optical fiber. When no strain due to an acoustic wave is produced in the optical fiber, the same intensity of Rayleigh scattered light except for noise is obtained at every time of the repetition. When strain due to an acoustic wave is produced in the optical fiber, the intensity of Rayleigh scattered light varies at every time of the repetition. The acoustic wave can be detected from the variation. Since the time elapsed from injection of the optical pulse into the optical fiber to reception of the Rayleigh scattered light responsive to the pulse is the round-trip time to and from each point of the optical fiber, a distance to a longitudinal position of the optical fiber at which the acoustic wave exists can be determined. This principle is also applied to the distributed acoustic detection device shown in FIG. 1.

The above-described Rayleigh scattering in an optical fiber is caused by randomness of molecular arrangement in the optical fiber, because the random arrangement induces a micro fluctuation in optical refraction index or electric susceptibility in the order of the intermolecular distance. The pattern of the micro fluctuation is determined at production of fibers; hence, the pattern is inherent fiber by fiber.

In order to compare between DAS-I and DAS-P by a simulation-based examination, a mathematical model of Rayleigh scattering is first considered below. Rayleigh scattering is mathematically expressed as an integral of the product of lightwave and the back scattering coefficient $\rho(z)$ along an optical fiber (see, for example, Non-Patent Document 2), where $\rho(z)$ takes a complex value based on spatial white Gaussian process.

If light is perfectly coherent, a Rayleigh scattered baseband signal responsive to the injected optical pulse is expressed by a short-time Fourier transform (STFT) of $\rho(z)$. Assuming that the frequency of the light used is varied around a reference frequency $\omega$: expressed as $\omega+\Delta\omega$, the short-time Fourier transform is expressed by the following formula (1):

$$X(z, \Delta\omega) = \int_{z-l_p}^{z} \rho(z) e^{-i(\omega_m + \Delta\omega_m)\zeta} d\zeta \equiv \sqrt{I_R(z, \Delta\omega)} \, e^{i\phi_R(z,\Delta\omega) - i\Delta\omega_m z}, \quad (1)$$

where $l_p$ is a spatial pulse length and expressed as $l_p = v_g * D/2$ letting D be a temporal pulse width; $\omega_m$ ($=2\omega/v_g$), a spatial frequency (wavenumber) corresponding to the frequency $\omega$ of the light; and $v_g$, a group velocity of the laser light in an optical fiber. The reference frequency $\omega$ is set here to a value of about 200 THz, for example. It should be noted that $\Delta\omega$ is a frequency varied from the reference frequency $\omega$ and takes not only a positive value but also a negative value.

An acoustic wave in the optical fiber is detected as strain in the longitudinal direction. Specifically, when an acoustic wave propagates through a media such as gas and reaches an optical fiber, in other words, the acoustic wave impinges on the optical fiber, a very small strain is produced in the optical fiber. Here, defining the amplitude of the acoustic wave as a positional function $a_k(z)$ when a k-th pulse is injected and omitting a constant, the Rayleigh scattered light is expressed as the following formula (2):

$$X_k(z) = \sqrt{I_R(z, \gamma a_k(z))} \exp\left[i\phi_R(z, \gamma a_k(z)) - i\gamma_m \int_0^z a_k(\zeta) d\zeta\right], \quad (2)$$

where $\gamma$ is a coefficient determining a relationship between the strain and a frequency shift of the Rayleigh scattering, and $\gamma_m$ is defined as $\gamma_m = 2\gamma/v_g$.

From the formula (2), the intensity of Rayleigh scattering when the acoustic wave exists in the optical fiber is expressed as the following formula (3):

$$I_k(z) = I_R(z, \gamma a_k(z)) \quad (3)$$

And the phase of Rayleigh scattering when the acoustic wave exists in the optical fiber is expresses as the following formula (4):

$$\phi_k(z) = \phi_R(z, \gamma a_k(z)) - (2/v_g) \int_0^z \gamma a_k(\zeta) d\zeta \quad (4)$$

While it is found that both formulas (3) and (4) contain the variable concerning the acoustic wave, the formula for the phase contains the variable in the integral form.

Figure 3:
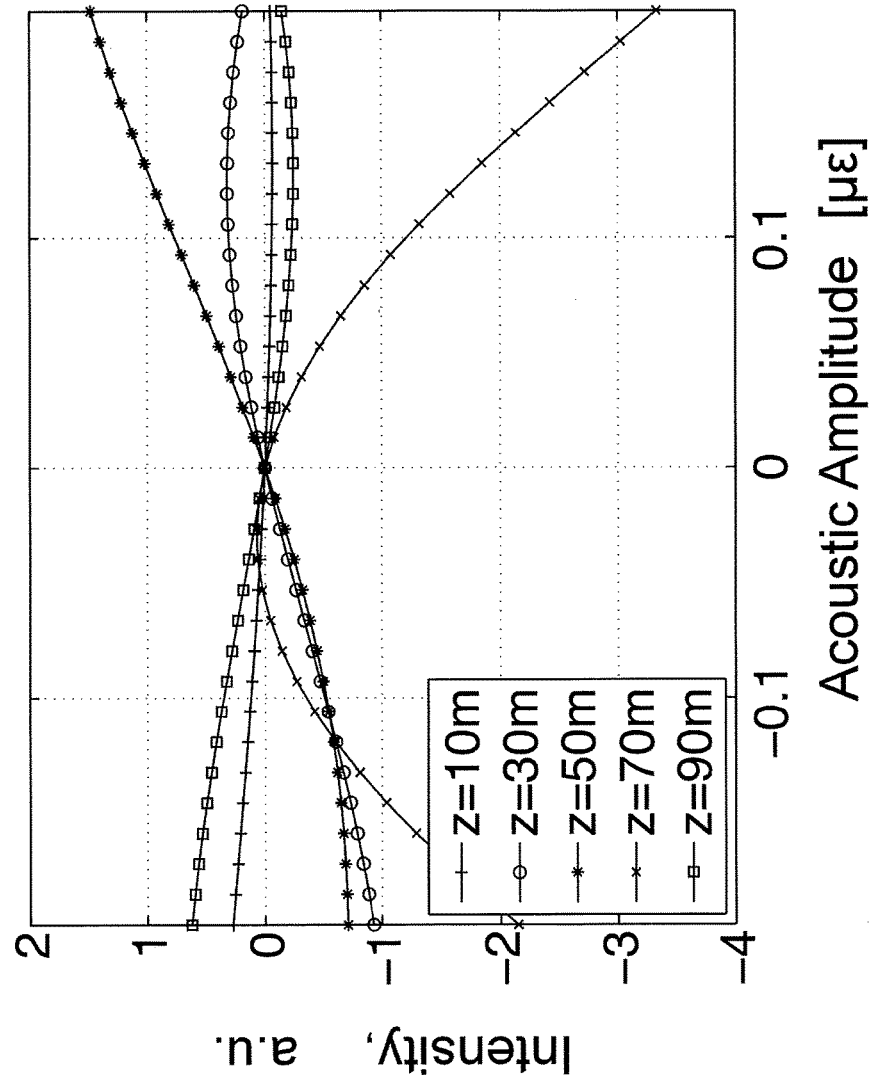
FIG. 3 is an example of a relationship between intensities of DAS-I signals and acoustic amplitudes.

In the case of DAS-I based on the intensity change, the Rayleigh scattered intensity spectrum, which is a random spectrum, behaves independently on the spatial pulse length $l_p$ in the lengthwise direction and independently on the frequency interval $v_g/2l_p$ (100 MHz for $l_p=1$ m and 20 MHz for $l_p=5$ m, where the group velocity of light is assumed to be 200,000 km/s) in the frequency direction. When the acoustic wave exists in the optical fiber, the oscillation in frequency equivalent to the strain oscillation due to the acoustic wave causes the intensity oscillation, thus enabling the acoustic detection. Note that variation of the intensity is different depending on a position z of the optical fiber (see the formula (3)). While the relationship between the signal component of DAS-I and the amplitude of the acoustic wave can be linearized when the acoustic wave is sufficiently small, the coefficient in the linearization depends on the position z and takes either a positive or a negative value (see FIG. 3).

Figure 4:
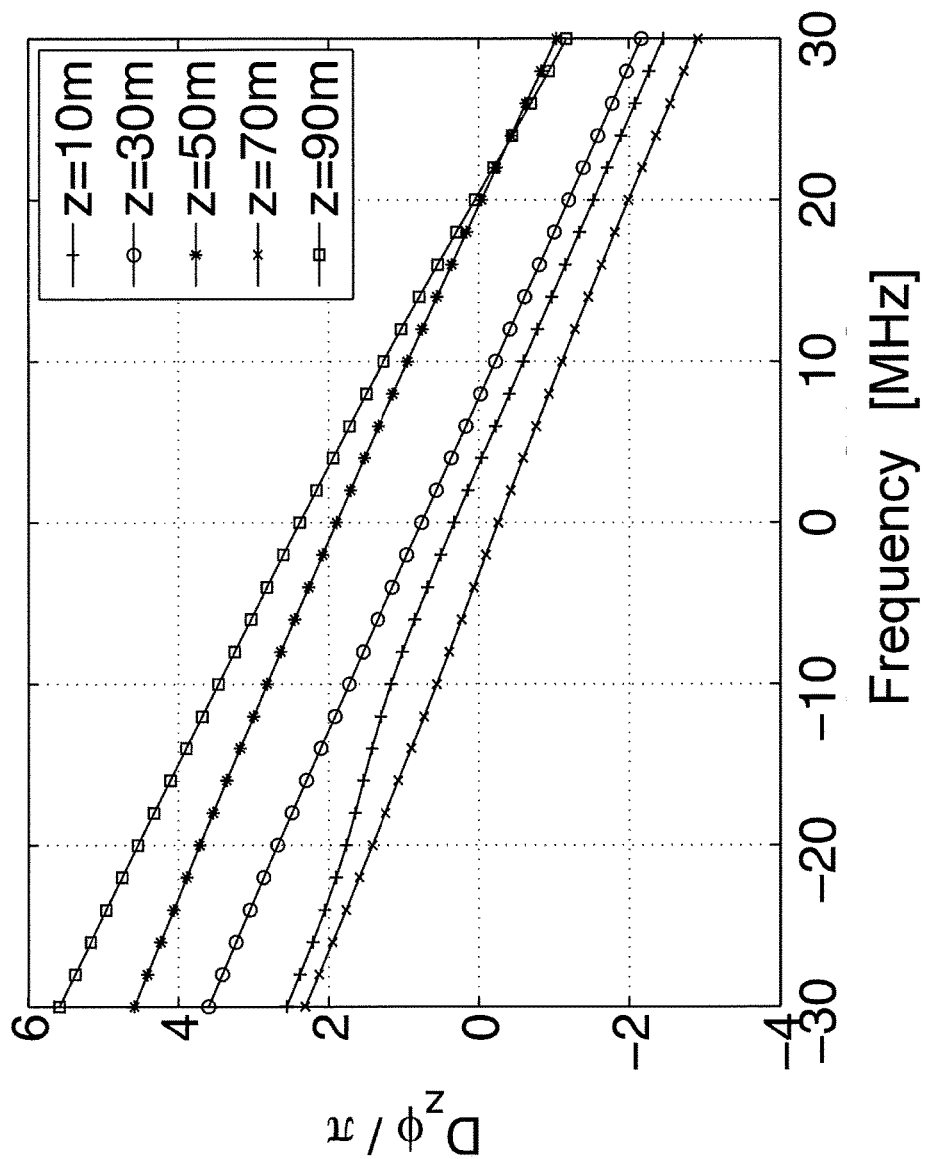
FIG. 4 is an example of a relationship between intensities of the DAS-P signals and acoustic amplitudes.

In contrast, in the case of DAS-P based on the phase change, since the term concerning the acoustic wave is contained in the spatial integral form, a spatial differentiation or a spatial difference is needed to measure the acoustic distribution from the phase of the Rayleigh scattering. Hence, the difference interval is expressed as $\Delta z$ and it is assumed that the acoustic wave does not change within the interval. Under such the assumption, strain oscillation (equivalent to the oscillation in the frequency direction) due to the acoustic wave causes an oscillation in phase difference. The relationship between the acoustic wave and the phase difference is substantially linear and its tangents are the same (see FIG. 4). Thus, it is found that the acoustic wave can be detected from the phase difference. In addition, it is known that using a shorter width pulse brings better the linearity between the acoustic wave and the phase difference.

Here, appended is a brief description of heterodyne reception. In DAS, optical heterodyne reception using a heterodyne detector is employed in processing two waveforms to eliminate the above-mentioned influence of polarization. In order to perform the optical heterodyne reception, the polarization states of the received light and the reference light are necessary to be coincident with each other. In an ordinal optical fiber, however, the polarization state varies along the optical fiber; hence, the polarization state of received light is unknown. In order to cope with this situation, the received light is separated into two orthogonal polarization components and detection is performed for each component (This technique is generally referred to as polarization diversity).

As described above, in a typical DAS, phase noise of laser light significantly affects detection performance in detecting an acoustic wave. In order to resolve the problem, the present invention proposes a DAS using phase noise cancellation (hereinafter referred to as "PNC"). Note that, it is assumed that a Rayleigh scattered signal has a sufficiently high signal-to-noise ratio, in other words, a case is dealt with where the observation noise is small enough to neglect. In the following description, the distributed acoustic measurement using this technique is referred to as "PNC-DAS" in abbreviation.

Figure 5:
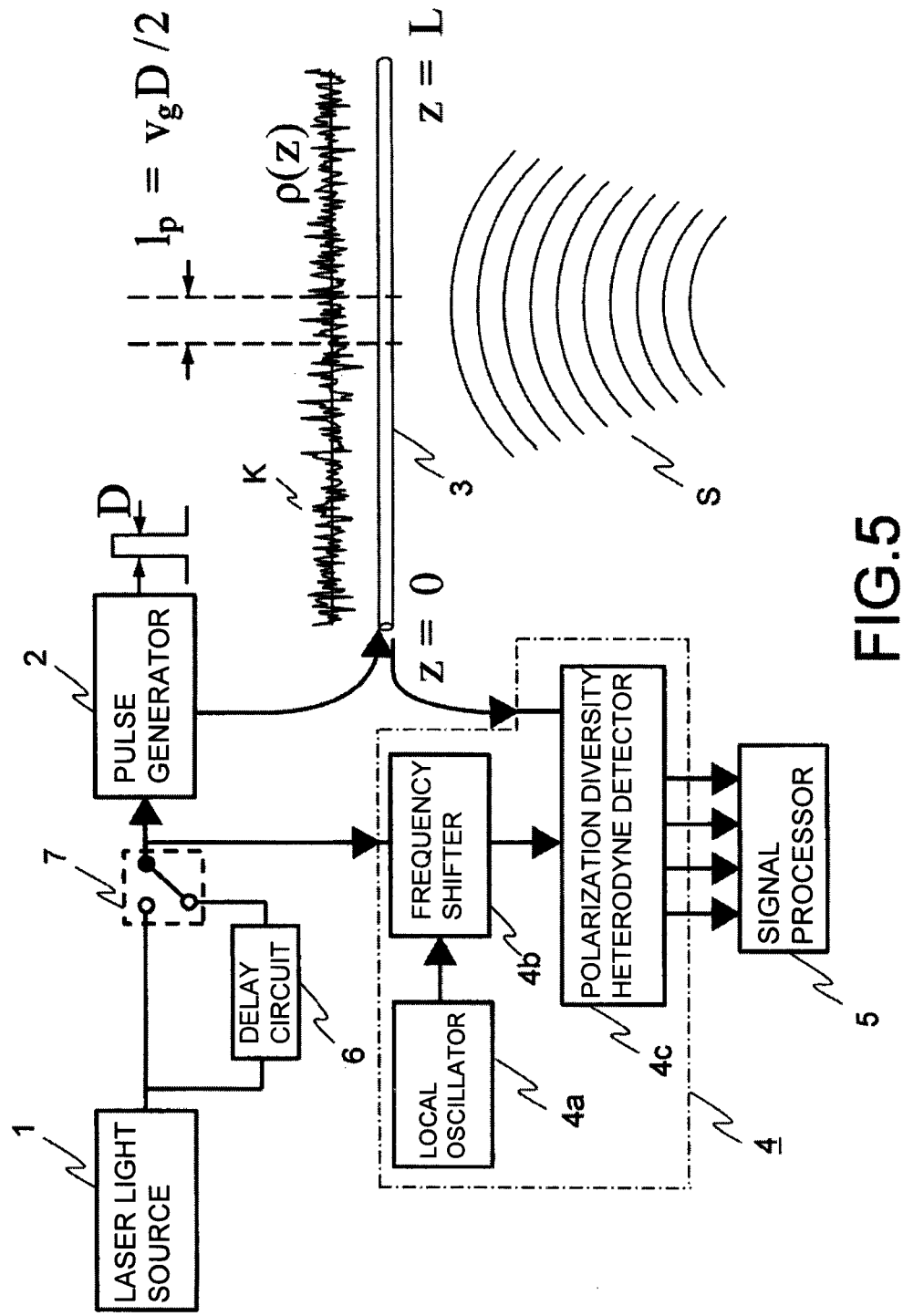
FIG. 5 is a diagram showing an example of a basic configuration of the distributed fiber optic acoustic detection device according to Embodiment 1 of the present invention.

An example of a distributed fiber optic acoustic detection device according to Embodiment 1 of the present invention is shown in FIG. 5. Comparing with FIG. 1, a difference is in that two constituent components of a delay circuit 6 and a switching circuit 7 are additionally provided between the laser light source 1 and the pulse generator 2. The PNC-DAS uses a replica of a prove pulse in addition to the prove pulse containing phase noise. The prove light is injected into the optical fiber 3 to repeat the measurement a necessary number of times, that is, during a time necessary for measuring an acoustic wave in order of the first prove pulse, the first replica pulse (hereinafter simply referred to as a replica), which is a replica of the first prove pulse, the second prove pulse, the second replica, . . . , the n-th prove pulse, and the n-th replica. Moreover, injection of the prove pulse and the replica is needed to be repeated regularly one after the other as described above.

The injection is repeated typically at fixed time intervals Δt. More specifically, all of the time interval between the first prove pulse and the first replica, that between the first replica and the second prove pulse, that between the second prove pulse and the second replica, and so on, are the same time interval Δt. The time interval Δt is set longer than $\Delta t_s$ defined by the following formula (5), i.e., $\Delta t > \Delta t_s$ for these pulses not to overlap with each other.

$$\Delta t_s = 2L_f / v_g \tag{5}$$

where $L_f$ is the (longitudinal) length of the optical fiber; $v_g$, a group velocity of the laser light in the optical fiber. It should be noted that the time interval Δt is equal to the delay time of the delay circuit and the repetition is continued during the acoustic measurement.

The operation of the distributed fiber optic acoustic detection device according to Embodiment 1 of the present invention, in particular, different points in the operation from FIG. 1 is described below. The repetitive operation is described with reference to the distributed fiber optic acoustic detection device shown in FIG. 5. As shown in FIG. 5, using the delay circuit 6 provided for giving the delay time Δt corresponding to the repetition time interval of the pulse, the laser light directly from the laser light source 1 and a delayed laser light via the delay circuit are switched to each other by the switching circuit 7 to be repeatedly injected into the pulse generator. A little more specifically, in the operation of repeatedly injecting the laser light into the pulse generator, the prove pulse generated from the light emitted directly from the laser light source and the replica generated from the light delayed by the delay circuit are switched each other to be injected into the optical fiber.

In the signal processing for the PNC-DAS, the Rayleigh scattered signal responsive to an odd-numbered prove pulse is subtracted from the Rayleigh scattered signal responsive to the next even-numbered replica pulse. That is, the signal processing processes not the individual signals themselves but the difference between signals measured at different times. This brings about an advantageous effect of perfectly eliminate the influence of phase noise contained in the laser light. Note that since one desired signal is obtained from one pair of the measured signals, the substantial number of repetitions is reduced to half the number of pulses.

While specific signal processing procedures of DAS-I utilizing scattered light intensity and DAS-P utilizing scattered light phase are different from each other, a difference between the signal processing procedures in the PNC-DASs of the present invention and those in DAS-I and DAS-P can be explained as follows. First, the difference between DAS-I and the PNC-DAS-I is described. Since the PNC-DAS-I measures a time difference of an acoustic wave and need not calculate an average of Rayleigh scattered signals, the signal processing in the PNC-DAS-I is simpler than that in DAS-I. Specifically, the signal processing for the PNC-DAS-I only needs to subtract an odd-numbered signal from the next even-numbered signal. That is, using the above expression of the pulse order, the Rayleigh scattered signal responsive to the j-th prove pulse is only subtracted from the Rayleigh scattered signal responsive to the j-th replica pulse, where j is a natural number: 1, 2, 3, . . . , n.

Next, the signal processing for the PNC-DAS-P is describes. The signal processing in the PNC-DAS-P necessitates spatial differentiation and phase unwrapping as with that in DAS-P. The necessity of the spatial differentiation of the phase is described first. Since the following formula (6) is obtained by differentiating the above formula (4) with respect to the positional coordinate z, it is found that the acoustic amplitude $a_k(z)$ can be calculated:

$$\frac{d}{dz}\phi_k(z) = -\gamma_m a_k(z), \tag{6}$$

where the left side of the formula (6) corresponds to the spatial differentiation of the phase.

In DAS-P measurement, the phase of its signal is processed as having a value ranging from 0 to 2π: the phase signal is wrapped. Since a discontinuous point occurs in the measured phase signal processing, in order to correct the discontinuous signal and handle it as a continuous signal, unwrapping of the phase signal is needed. The same situation is true for the PNC-DAS-P signal processing. Hence, in the PNC-DAS-P signal processing, the Rayleigh scattered signal responsive to an odd-numbered prove pulse is subtracted from the Rayleigh scattered signal responsive to the next even-numbered replica pulse using the same signal processor as that used in DAS-P.

The following describes that the measurement using the distributed fiber optic acoustic detection device using the PNC-DAS according to Embodiment 1 of the present invention has the effect of cancelling phase noise in the laser light by comparing the difference between the results of the simulations of acoustic measurements using DAS and the PNC-DAS under a certain conditions.

Figure 6:
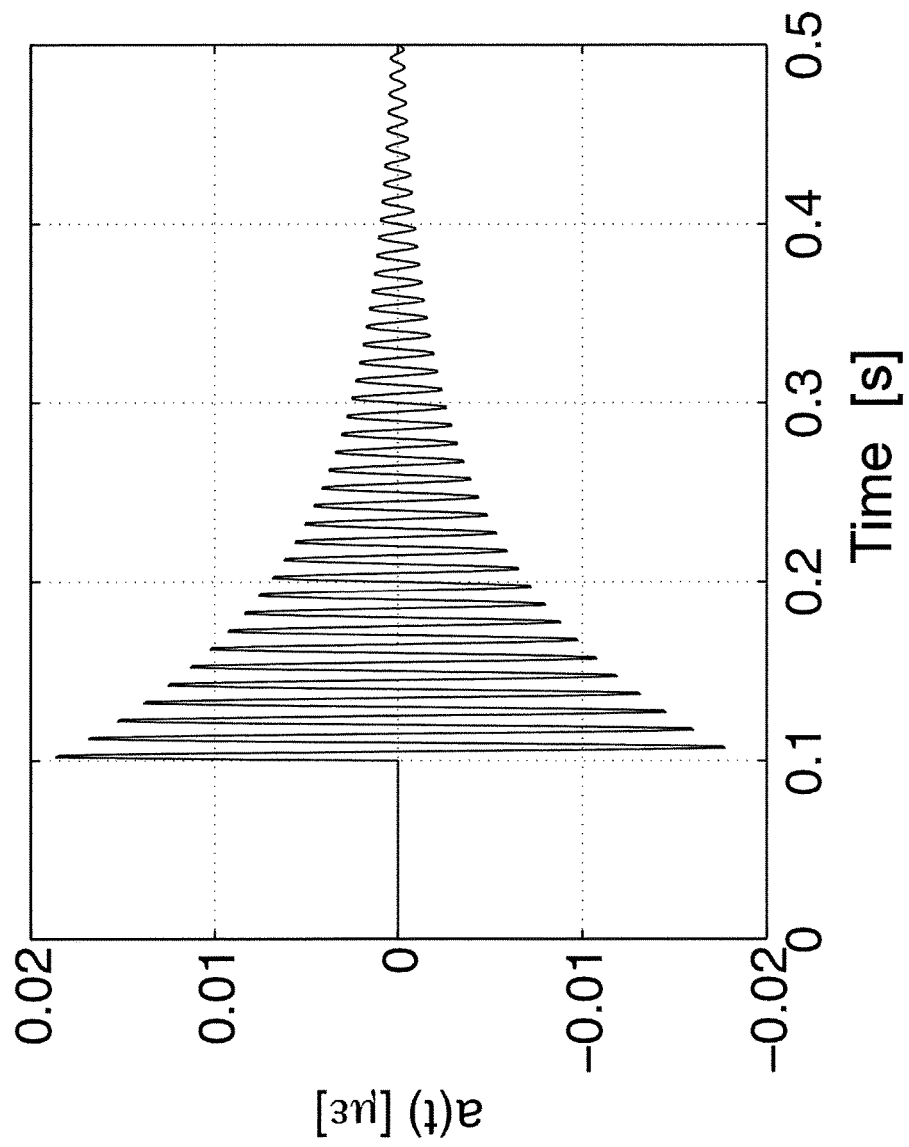
FIG. 6 is an example of an acoustic wave used in a simulation for the distributed fiber optic acoustic detection device according to Embodiment 1 of the present invention.

An acoustic wave used is the dumped oscillation shown in FIG. 6 and expressed by the following formula (7):

$$a(t)=a_0 e^{-(t-t_0)/\tau_A} \sin(2\pi f_A(t-t_0)) \qquad (7),$$

where $a_0$ is the maximum amplitude of the acoustic wave; $f_A$, the frequency of the acoustic wave; $\tau_A$, a damping time; and $t_0$, a start time of the acoustic wave. This is because a damped oscillation can be considered to be an appropriate oscillation model for the Embodiment 1 since Embodiment 1 deals with a case of an acoustic wave impinging on the optical fiber and the damped oscillation is a typical oscillatory phenomenon when the acoustic wave is produced such as by a fracture or a crush. In addition, the acoustic wave in the optical fiber can be regarded as the oscillation in the longitudinal direction.

In FIG. 6, the acoustic amplitude a(t) on the vertical axis represents the magnitude of strain in the optical fiber. The strain is defined as a displacement per unit length. Ordinarily, the strain is very small. Hence, the strain due to the acoustic wave is expressed here using the unit of one-millionth strain (=1με). The horizontal axis represents time in second and corresponding to t in the formula (7). Letting a time to inject the prove pulse represent as $t_k=k*\Delta t$, where $\Delta t$ is the repetition time interval and k=1, 2, 3 . . . , n, the acoustic amplitude $a_k$ responsive to a k-th injected prove pulse is expressed as $a_k=a(t_k)$.

The certain conditions for the simulations are assumed as follows:

The length $L_f$ of the optical is 100 m and the same acoustic wave exists at all longitudinal positions z in the optical fiber;

The laser light has a linewidth (half-value width) of 100 kHz sufficiently wider compared to that of 10 kHz; and The SN ratio of observation noise is set to 40 dB for neglecting the influence of the observation noise.

In sum, a very large laser light linewidth and a very small observation noise are set as the simulation conditions.

Figure 9:
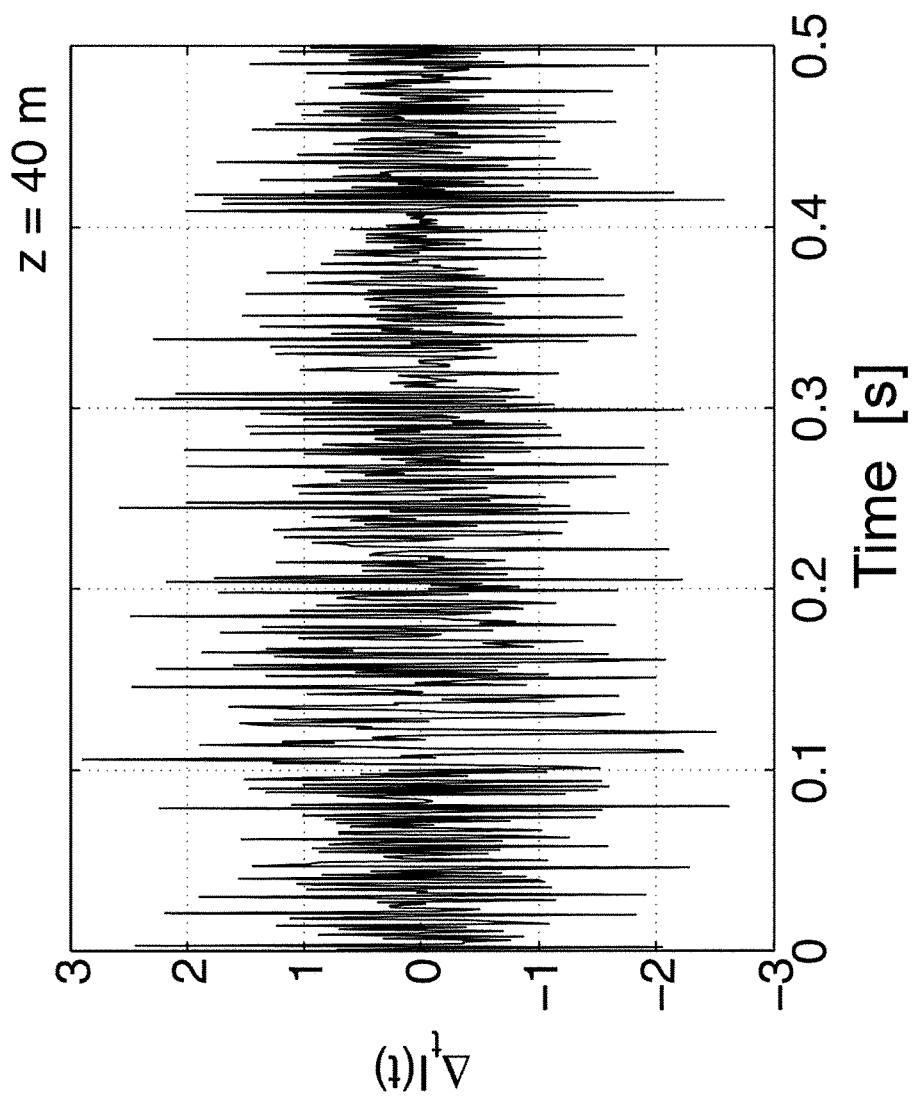
FIG. 9 shows a time-difference waveform of the temporal intensity waveform shown in FIG. 7.
Figure 10:
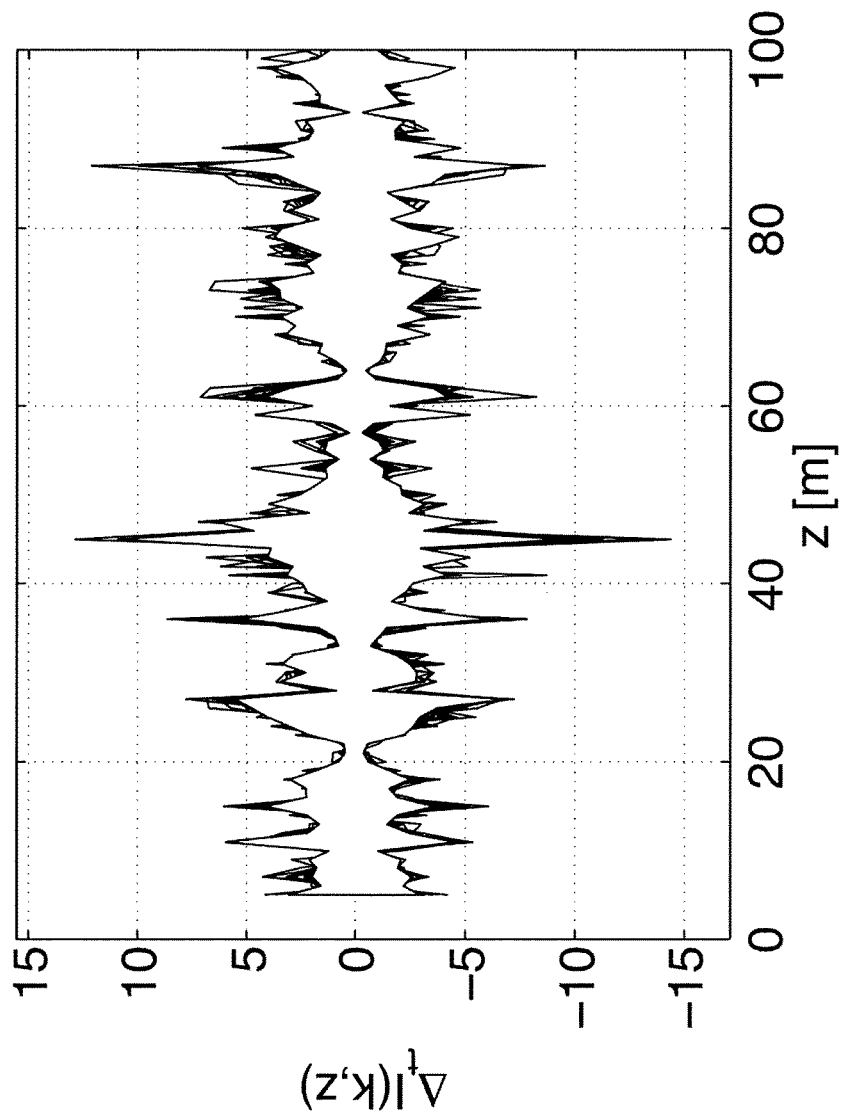
FIG. 10 shows a result of superimposed plots of time-difference waveforms, such as shown in FIG. 9, calculated for the entire simulation period.
Figure 11:
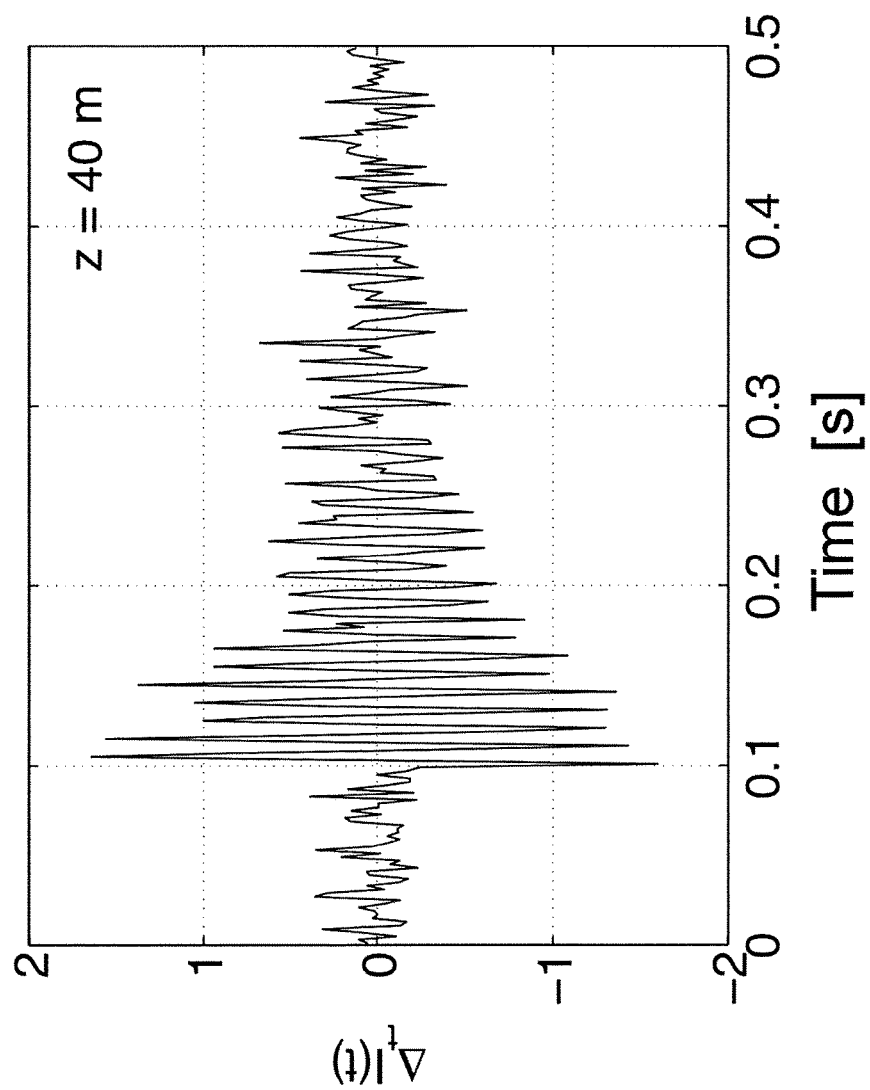
FIG. 11 is a time-difference temporal intensity waveform that is an example of a result of a simulation using a PNC-DAS-I according to Embodiment 1 of the present invention.
Figure 12:
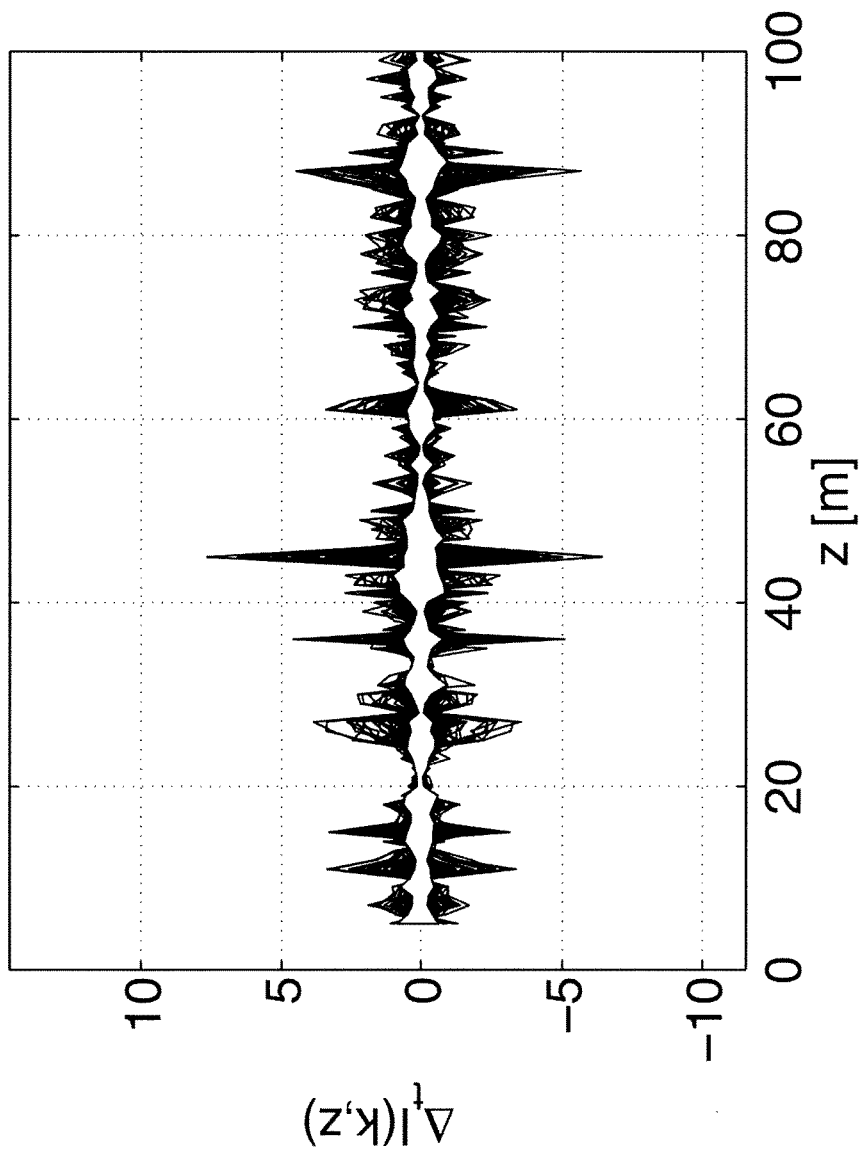
FIG. 12 shows an example of superimposed plots of time-difference waveforms, such as shown in FIG. 11, calculated for the entire simulation period using a PNC-DAS-I according to Embodiment 1 of the present invention.

Results of simulating DAS-I and the PNC-DAS-I under these conditions are described first with reference to FIGS. 7 to 12. FIGS. 7 to 10 show results of simulating the DAS-I and FIGS. 11 and 12 show results of simulating the PNC-DAS-I.

In these simulations, the maximum amplitude $a_0$ of the acoustic wave used corresponds to a strain of 0.02με, where 1με is a strain of one millionth as mentioned above, and a value of $l_p$, which is the spatial pulse length, is 5 m, which corresponds to the value of D (shown in FIGS. 1 and 5) being 50 ns. The values of other parameters are as follows:

Parameter values for the acoustic wave are $f_A$=0.1 kHz, $\tau_A$=0.1 sec, and $t_0$=0.1 sec.

Parameter values for the DAS-I are the laser light linewidth $\Delta f$=100 kHz and the pulse repetition interval $\Delta t$=1 msec, and a data sampling interval is 10 nsec (corresponding to 1 m of the fiber).

Figure 7:
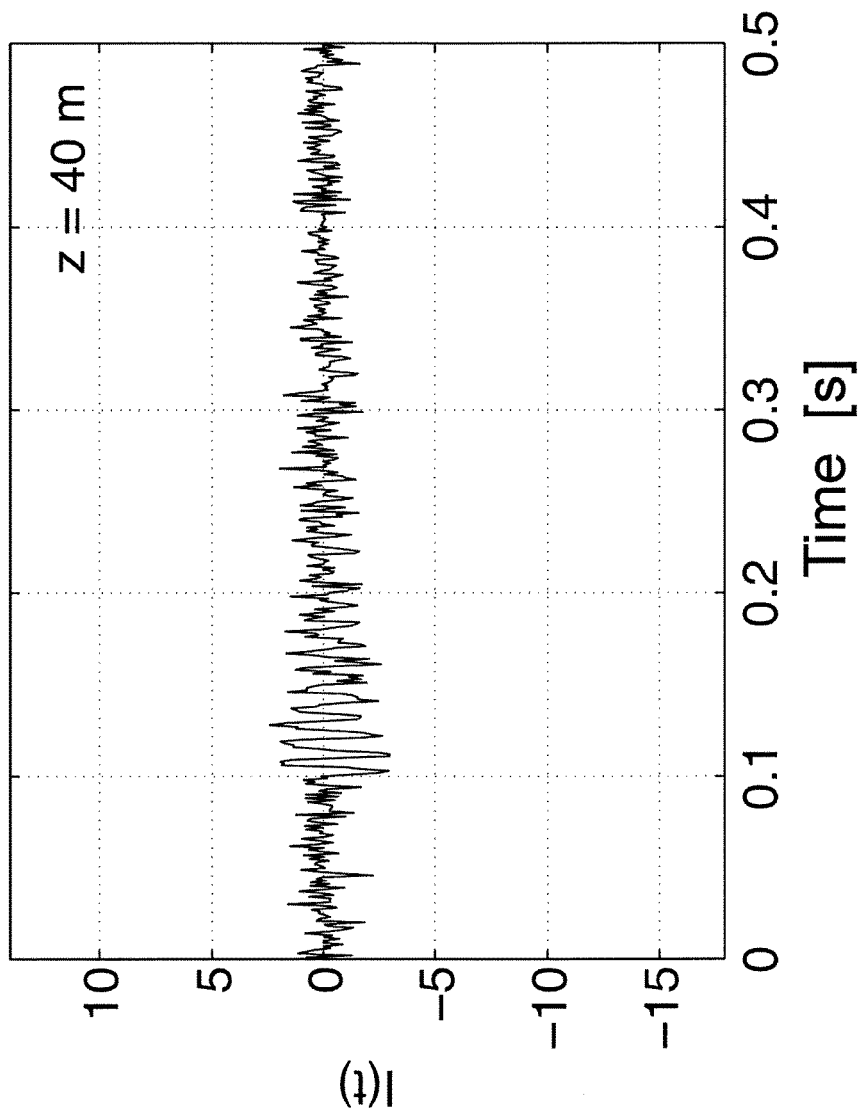
FIG. 7 is an example of a temporal intensity waveform obtained by processing a DAS-I signal responsive to the acoustic wave shown in FIG. 6.
Figure 8:
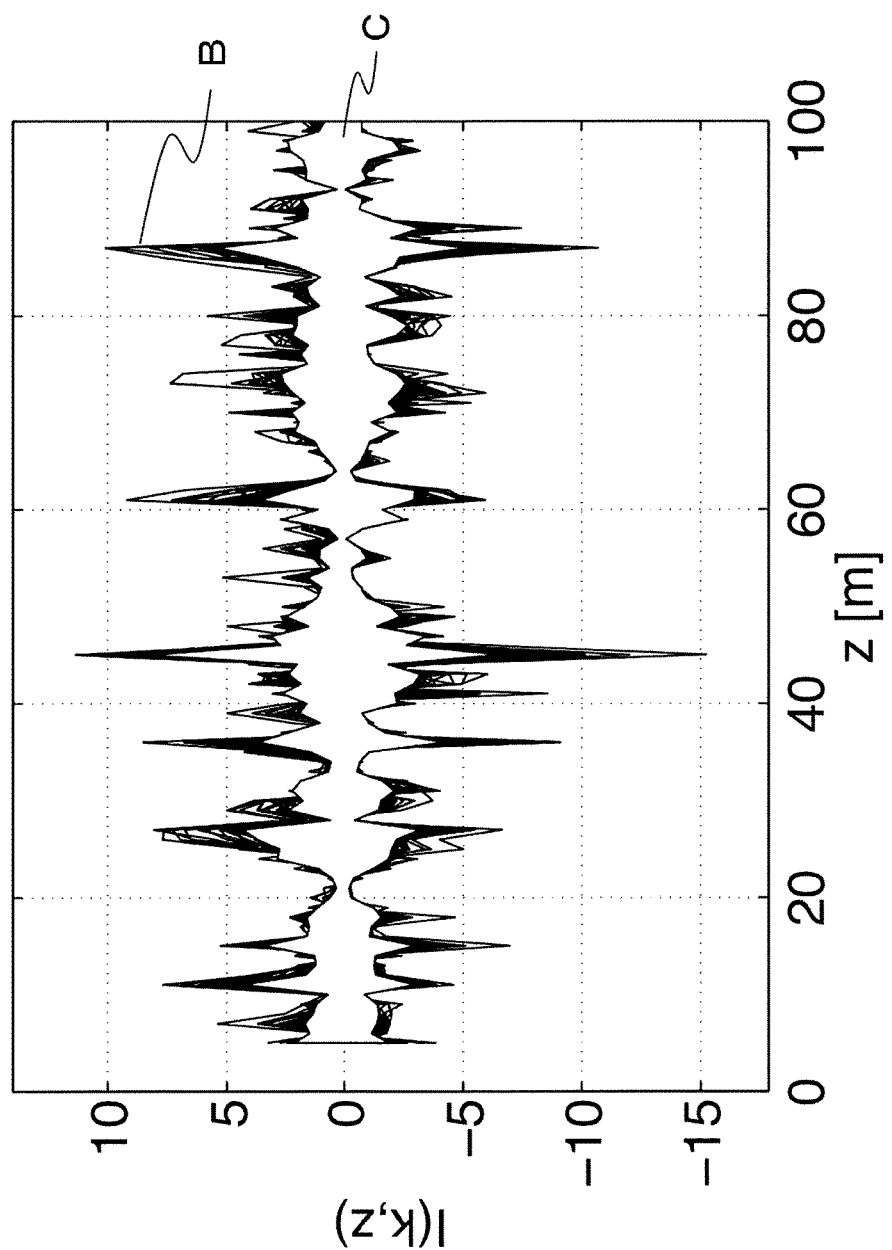
FIG. 8 shows superimposed plots of spatial intensity waveforms calculated for the entire simulation period by processing a DAS-I signal responsive to the acoustic wave shown in FIG. 6.

FIG. 7 shows an intensity waveform obtained by processing a DAS-I signal responsive to the acoustic wave shown in FIG. 6, and FIG. 8 shows superimposed plots of DAS-I waveforms calculated for the entire simulation period. In addition, FIG. 7 represents a simulated temporal intensity waveform $I_k(z)$ of the acoustic wave at a position z fixed to 40 m.

The intensity of Rayleigh scattered light returning to the input end from a scattering position Z along the optical fiber is a function of time and space and can be generally expressed as I(t,z). Since the time takes a discrete time $t_k=k*\Delta t$ (k=1, 2, 3, . . . , n) for injecting the prove pulse, the intensity of Rayleigh scattered light responsive to a k-th prove pulse is expressed as $I_k(z)$. FIGS. 7 and 8 show plots of the $I_k(z)$. FIG. 7 shows the temporal waveform, i.e., plots of the relationship between $t_k$ and $I_k(t_k)$ at a position Z fixed to 40 m. Note that the vertical axis is expressed as I(t) in FIG. 7. This figure shows that the oscillatory acoustic waveform is converted to the oscillatory intensity waveform. This conversion varies significantly with the position z (see next FIG. 8). FIG. 8 shows the superimposed plots of the spatial waveforms of the intensities $I_k(z)$ calculated for the entire simulation period and at the entire positions z.

FIGS. 9 to 12 show plots of time differences of the Rayleigh scattered intensity, i.e., plots of the differences calculated using the following formula (8):

$$\Delta_t I_k(Z)=I_k(z)-I_{k-1}(z) \qquad (8).$$

FIGS. 9 and 10 show the time differences plotted for all ks (=1, 2, 3, . . . ), and FIGS. 11 and 12 show those plotted for even-number ks (=2, 4, 6, . . . ). This is because, in the PNC-DAS, an even-numbered prove pulse is a replica of the odd-numbered prove pulse one count therebefore and subtraction of an intensity $I_{k-1}(z)$ from the next even-numbered $I_k(z)$ brings about an effect of cancelling the phase noise out. Both FIGS. 9 and 11 each show a temporal waveform at a fixed position z, and FIGS. 10 and 12 each show superimposed plots of spatial waveforms for all ks (but all even ks for FIG. 12).

Figure 14:
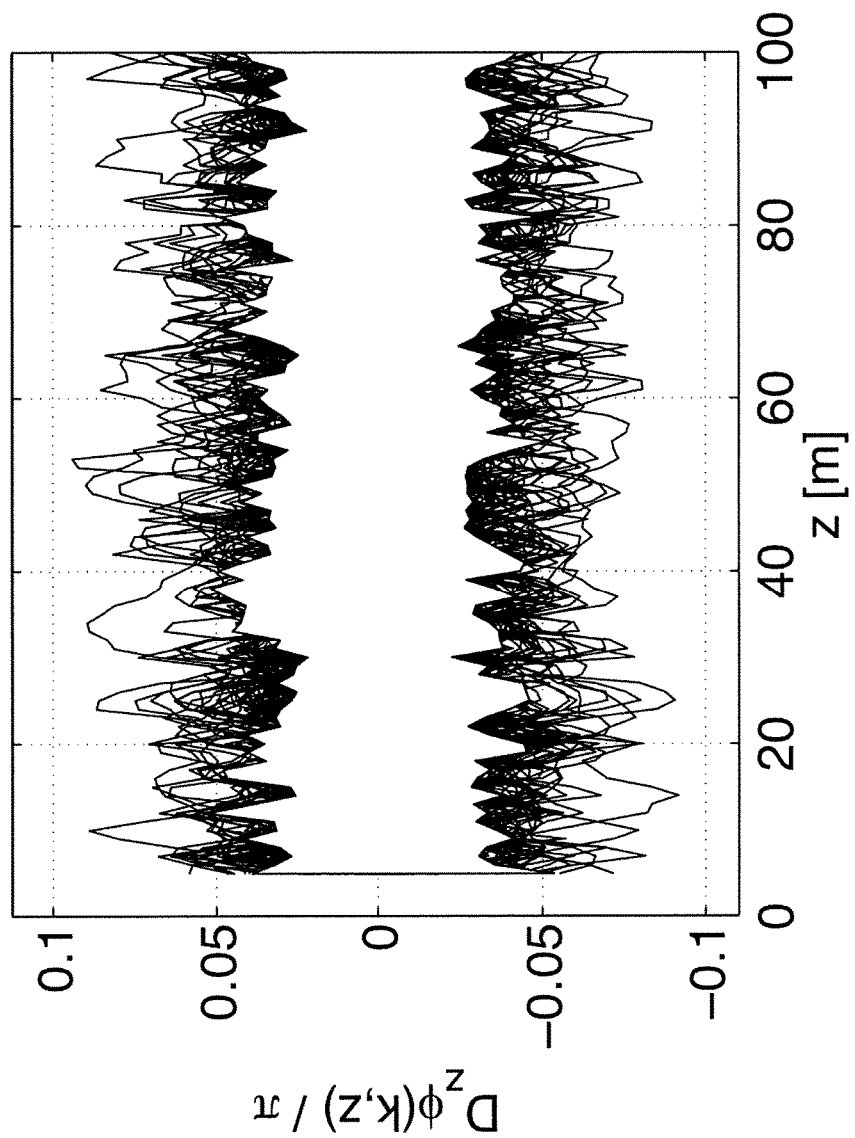
FIG. 14 shows superimposed plots of DAS-P temporal waveforms, such as shown in FIG. 13, calculated for the entire simulation period.
Figure 16:
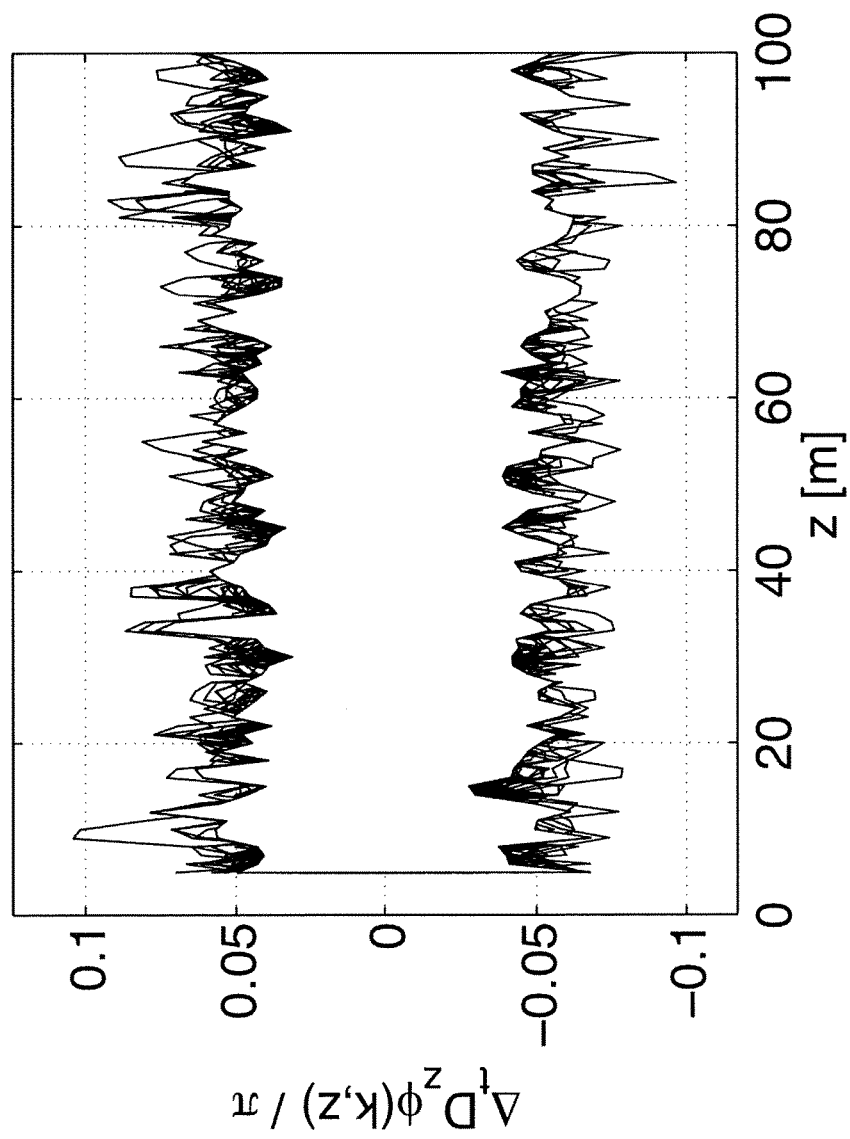
FIG. 16 shows superimposed plots of time-difference waveforms, such as shown in FIG. 15, calculated for the entire simulation period.
Figure 18:
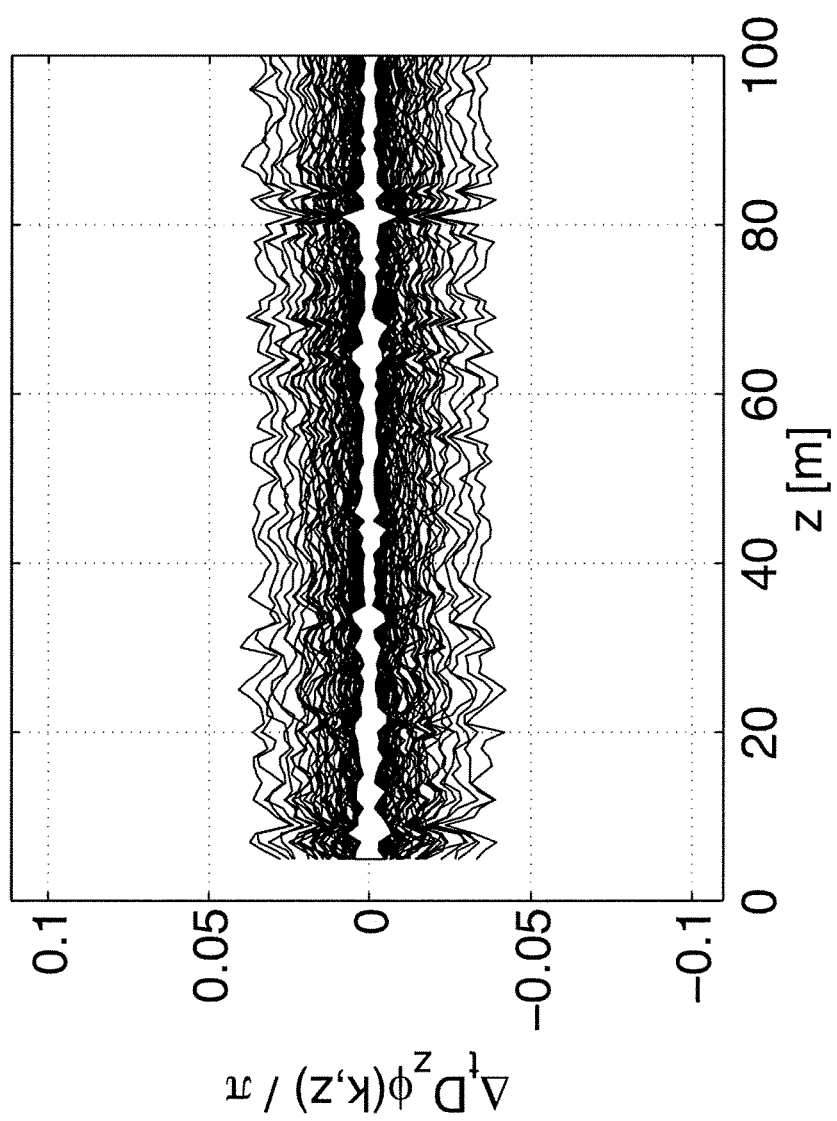
FIG. 18 shows superimposed plots of time-difference waveforms, such as shown in FIG. 17, calculated for the entire time period of the simulation.

In FIG. 8, the ensemble of white lines, which are indicated by the region C including and near the vertical zero, denotes spatial waveforms each containing only noise during a time period (time t: 0 sec<t<0.1 sec) and the ensemble of black lines, which are indicated by the region B), denotes spatial waveforms each containing noise and the signal during a time period (time t: 0.1 sec<t<0.5 sec). While the spatial waveforms have a waveform pattern vertically symmetrical with respect to vertical zero, this is because the maximum acoustic amplitude $a_0$ is small enough to keep linearity in intensity change. It is found from the figure that the simulation result of the spatial waveform varies significantly with the position z. In addition, also in FIGS. 10, 12, 14, 16, and 18, the ensemble of white lines denotes spatial waveforms each containing only noise and the ensemble of black lines denotes spatial waveforms each containing noise and signals (FIGS. 14, 16, and 18 are described later in detail).

FIG. 9 shows a result of time-difference of the intensity waveform shown in FIG. 7, and FIG. 10 shows superimposed plots of time-difference waveforms, such as shown in FIG. 9, calculated for the entire simulation period. It is found from comparison to FIG. 8 that the spatial waveforms of only noise approximate spatial waveforms of signals and noise, and that the noise cannot be almost cancelled out.

In contrast to these figures, FIGS. 11 and 12 show results of PNC-DAS-I simulations and are comparable to FIGS. 9 and 10 showing the results of the DAS-I simulation, respectively. The result of PNC-DAS-I simulation of a time-difference of the intensity differs significantly from the result of the DAS-I simulation, and it can be said that the PNC-DAS-I simulation result represents a waveform rather close to the original damped acoustic wave shown in FIG. 6.

While, similarly, FIG. 12 shows the result contrastive to that shown in FIG. 10, the result also differs significantly from that shown in FIG. 10, and the noise level is suppressed to sufficiently small values compared to the signal level. Therefore, it is considered that these results effectively reflect the phase noise cancellation effect of the distributed fiber optic acoustic detection device according to Embodiment 1

Figure 17:
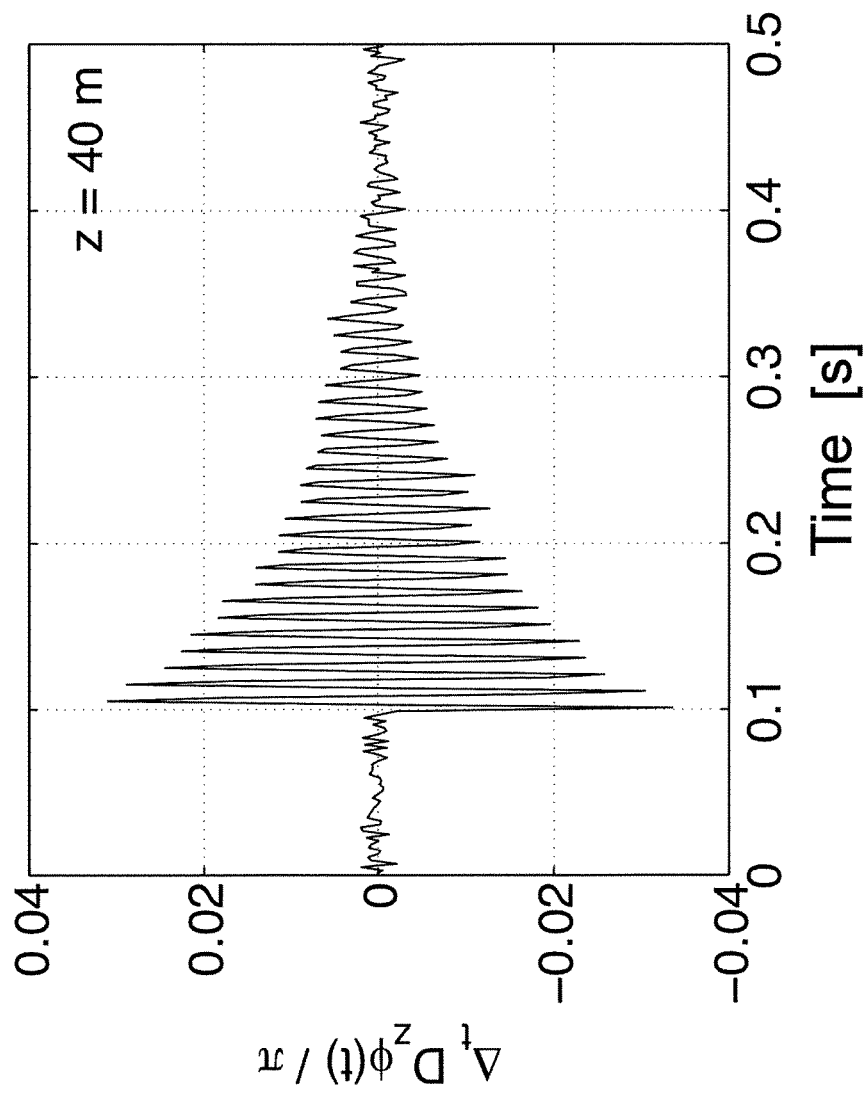
FIG. 17 is a time-difference waveform of the temporal waveform of spatial-difference phase that is a result of a simulation using a PNC-DAS-P according to Embodiment 1 of the present invention.

Next, results of the DAS-P and the PNC-DAS-P simulations are described with reference to FIGS. 13 to 18. FIGS. 13 to 16 show results of the DAS-P simulation, and FIGS. 17 and 18 show those of the PNC-DAS-P simulation.

Parameter values for the acoustic wave used in these simulations are the same as those used in the DAS-I simulations; hence, the description of these values are omitted. The spatial pulse length $l_p$ here is 1 m, which corresponds to the time width D (shown in FIGS. 1 and 5) being 10 nsec. The other parameter values used in the DAS-P simulation are the same as those used in the DAS-I simulation; hence, the description of these values is omitted here.

Figure 13:
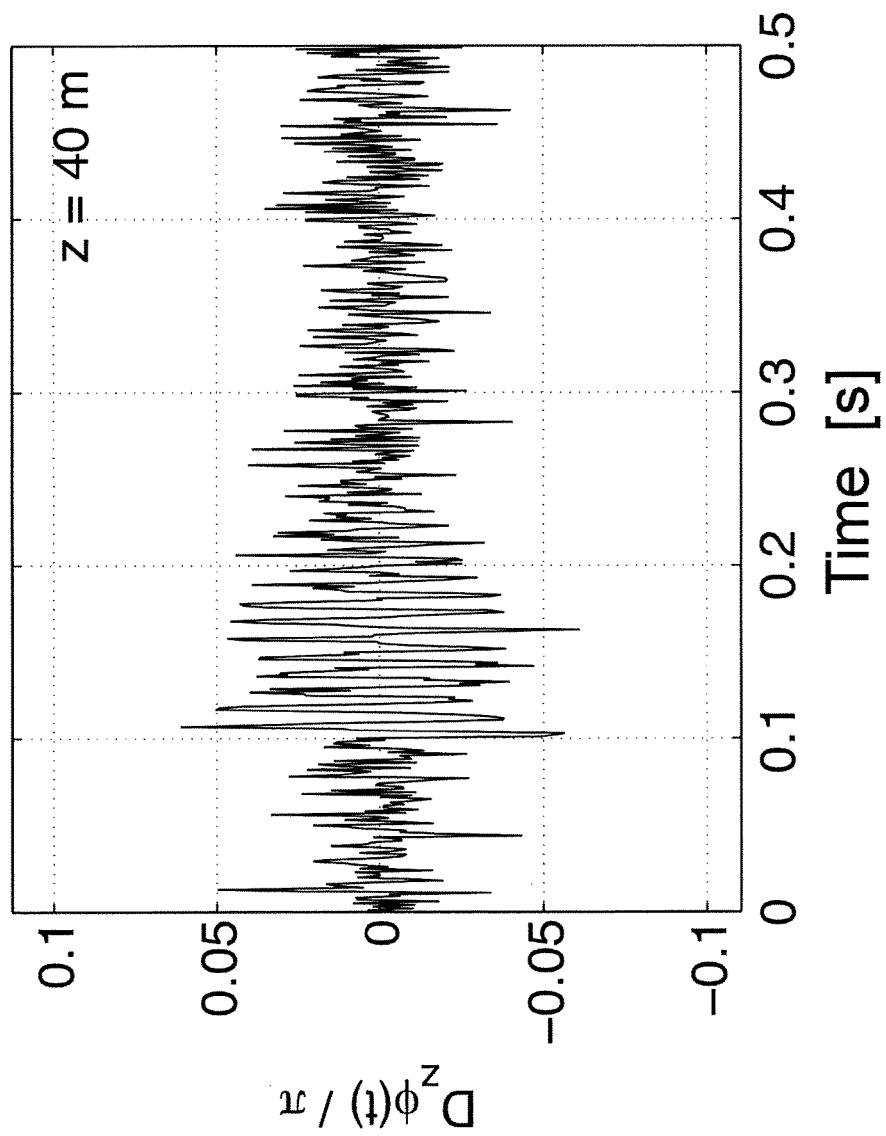
FIG. 13 is an example of a temporal waveform of a spatial difference phase that is a simulation result obtained by processing a DAS-P signal responsive to the acoustic wave shown in FIG. 6.

FIG. 13 shows a temporal waveform of the spatial difference $D_k \phi_k(z)$ of the phase obtained by the DAS-P processing of the scattered signal responsive to the acoustic wave shown in FIG. 6. The temporal waveform at a position fixed to 40 m is shown in FIG. 13. Note that the vertical axis is expressed as $D_z \phi(t)/\tau$ in FIG. 13. This figure shows that the oscillatory acoustic waveform is converted to the oscillatory phase waveform. While this conversion varies with the position z, it can be said that the conversion variation is smaller compared to the case with the DAS-I.

FIG. 14 shows superimposed plots of DAS-P temporal waveforms, such as shown in FIG. 13 as an example, calculated for the entire simulation period. As with FIG. 8, the ensemble of white lines denotes spatial waveforms each containing only noise during a time period (time t: 0 sec<t<0.1 sec) and the ensemble of black lines (indicated by the region B) denotes spatial waveforms each containing the noise and the signal during a time period (time t: 0.1 sec<t<0.5 sec). The spatial waveforms have a waveform pattern vertically symmetrical with respect to vertical zero. This reflects vertically symmetry of the original acoustic waveform and shows excellent repeatability. This figure shows that the result of simulating the spatial waveform less varies with the position z compared to the case with the DAS-I.

Figure 15:
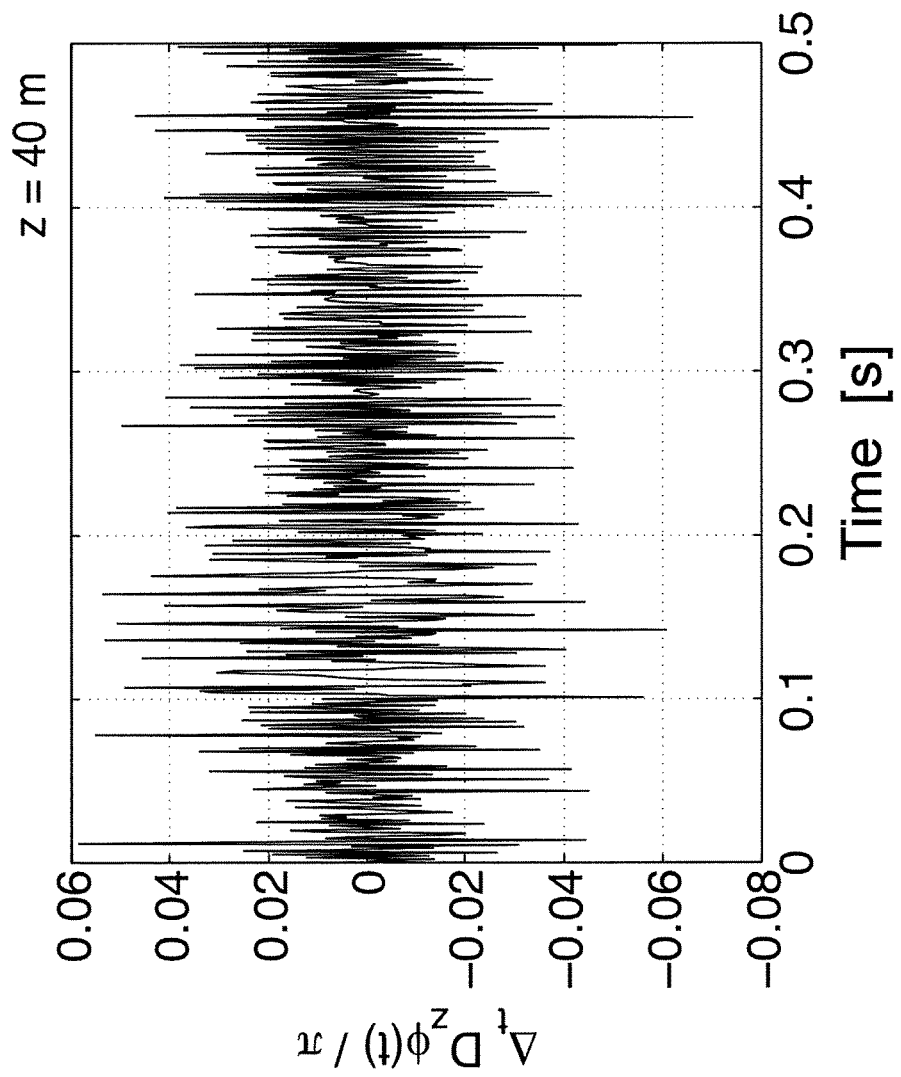
FIG. 15 is a time-difference waveform of the temporal waveform of spatial-difference phase shown in FIG. 13.

FIG. 15 shows a result of a time difference of the temporal phase waveform of the spatial-difference phase waveform shown in FIG. 13, and FIG. 16 shows superimposed plots of time-difference waveforms, such as shown in FIG. 15, calculated for the entire simulation period. It is found from comparison to FIG. 14 that the spatial waveform containing only noise approximates a spatial waveform containing the signal and the noise, and that the noise cannot be almost cancelled out.

In contrast to these figures, FIGS. 17 and 18 show results of the PNC-DAS-P simulation and are comparable to FIGS. 15 and 16 showing the results of the DAS-P simulation, respectively. The result of the PNC-DAS-P simulation of a time-difference temporal waveform of the spatial difference of the phase is differs significantly from the result of the DAS-P simulation, and it can be said that the PNC-DAS-P simulation result represents, as with the PNC-DAS-I simulation, a waveform rather close to the original damped acoustic wave shown in FIG. 6. While FIG. 18 shows a result contrastive to that shown in FIG. 16, the result is also differs significantly from that shown in FIG. 16. The noise level is suppressed to a sufficiently small value compared to the signal level. Therefore, it is considered that these results effectively reflect the effect of the phase noise cancellation of the distributed fiber optic acoustic detection device according to Embodiment 1

As described above, it is shown that both of the PNC-DAS-I and the PNC-DAS-P that are the phase noise cancellation technique of the distributed fiber optic acoustic detection device according to Embodiment 1 of the present invention has the effect of cancelling the phase noise out. Specifically, the effect is prominent under the following conditions:

a) the linewidth, i.e., the half-value width of laser light is 100 kHz or more and b) observation noise is low (its SN-ratio of 40 dB or higher), where the phase noise is dominant among noises.

While the above describes the results of the simulation taking as an example a damped acoustic oscillation, the same effect is achieved also for other waveforms not limited to that. Moreover, while the linewidth (half-value width) of the laser light is assumed to be 100 kHz sufficiently wider compared to 10 kHz, the same effect is achieved also for a linewidth of 100 kHz or wider not limited to 100 kHz. Furthermore, while the above simulations are made assuming that the SN ratio of observation noise is 40 dB, the same effect is achieved also for other SN ratio values if the other SN ratios are such a level that the influence of observation noise can be neglected.

Embodiment 2

Figure 19:
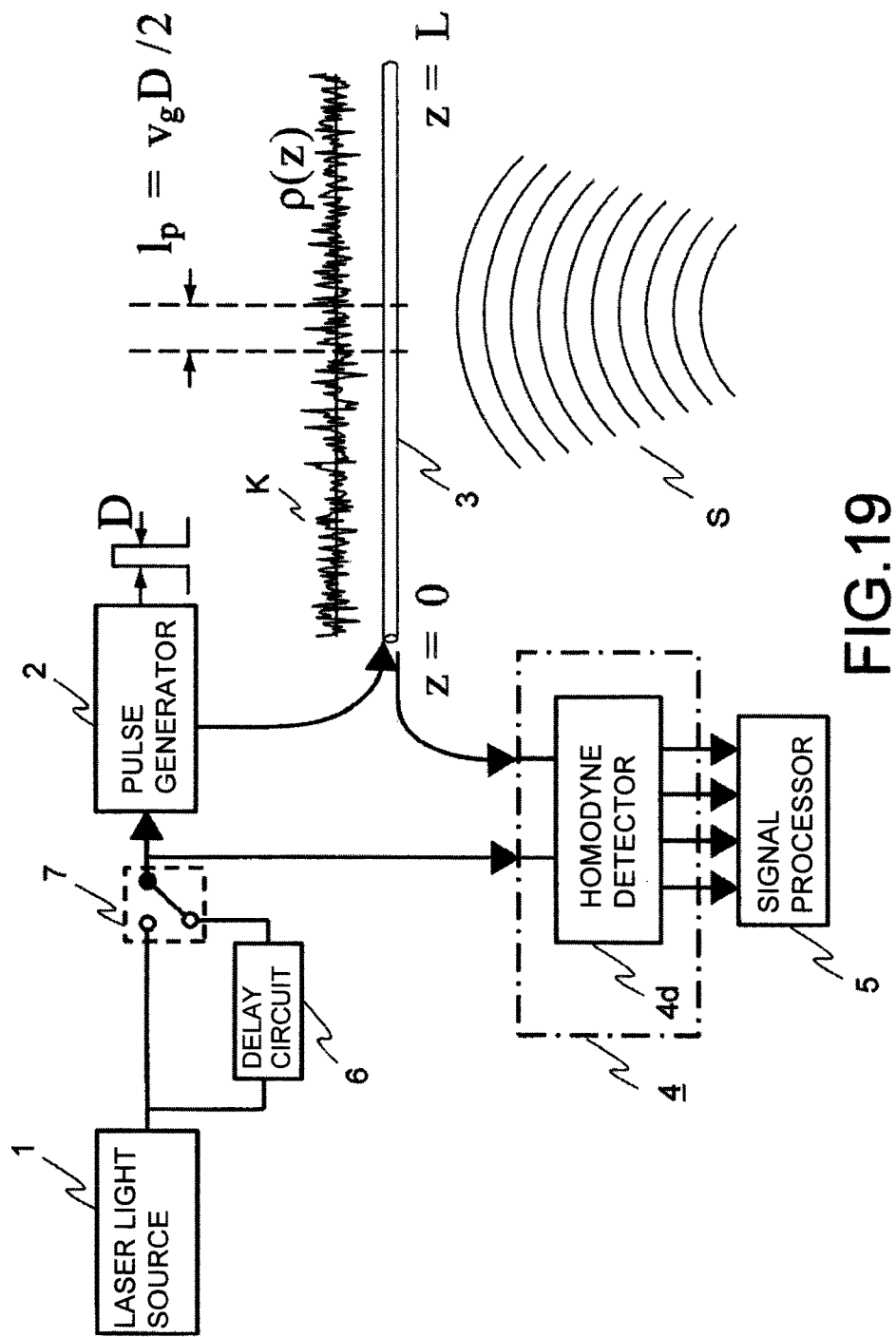
FIG. 19 is a diagram showing a configuration of a distributed fiber optic acoustic detection device according to Embodiment 2 of the present invention.

Embodiment 2 is described with reference to FIG. 19. FIG. 19 is a diagram showing a configuration of a distributed fiber optic acoustic detection device according to Embodiment 2, in which the method of detecting Rayleigh scattered light is different from that of Embodiment 1. Specifically, the configuration of Embodiment 2 corresponds to that not provided, among the constituent components shown in FIG. 2, with the local oscillator 4a and the frequency shifter 4b for shifting the frequency of the laser light from the laser light source 1. The detection method shown in the figure is called a homodyne detection method, and has an advantage of being able to simplify the circuit configuration because the local oscillator is unnecessary compared to Embodiment 1 using the heterodyne detection.

Embodiment 3

Embodiments 1 and 2 describe the distributed fiber optic acoustic detection devices for the example cases where the SN ratio of the observation noise is high enough, such as 40 dB for example, to neglect the observation noise. Embodiment 3 describes a distributed fiber optic acoustic detection device for a case where the SN ratio of the observation noise is not high enough.

The distributed fiber optic acoustic detection device according to Embodiment 3 is configured further, in addition to the configuration show in FIG. 5, with a modulator for modulating the optical pulse launched from the pulse generator and a demodulator for demodulating Rayleigh scattered light correspondingly to the modulation. This configuration also allows for bringing about the same effect as with Embodiment 1 for the case of the SN ratio of the observation noise not being high enough.

More specifically, the modulator modulates using a given code sequence the optical pulse launched from the pulse generator to inject the modulated pulse into the optical fiber, and the demodulator demodulates the Rayleigh scattered light caused by the modulated pulse. In short, the distributed fiber optic acoustic detection device is configured to utilizes pulse compression using the given code sequence. This configuration allows for bringing about the same effect as with the acoustic detection using a narrow optical pulse having high signal strength (see, for example, Patent Document 2). Thus, the distributed fiber optic acoustic detection device is applicable to a case of the SN ratio of the observation noise not being high enough, thereby bringing about the same effect as with Embodiment 1.

Embodiment 4

While Embodiments 1 and 2 describe the case of using the laser light from the laser light source 1 as the reference light for the heterodyne detection or the homodyne detection, Embodiment 4 uses, instead of the part A shown in FIG. 1, an interferometer configured with, for example, 3×3 optical couplers or 4×4 optical couplers without using the reference light from the laser light source (see, for example, Patent Document 3). With this configuration, spatial differences of the amplitude and the phase of the Rayleigh scattered light can also be obtained, thus bringing about an effect as with Embodiments 1 and 2. While the above is described taking the example of using the interferometer having 3×3 optical couplers or 4×4 optical couplers, the interferometer is not limited to this. Using an interferometer having m×m optical couplers, where m is a natural number of three or more, can also bring about the same effect.

It should be noted that each embodiment of the present invention may be freely combined, appropriately modified, or omitted within the spirit and the scope of the invention.

NUMERAL REFERENCE

1: laser light source; 2: pulse generator; 3; optical fiber; 4: detector; 4a: local oscillator; 4b: frequency shifter; 4c: polarization diversity heterodyne detector; 4d: homodyne detector; 5: signal processor; 6: delay circuit; 7: switching circuit; D: temporal pulse width; $l_p$: spatial pulse length; $L_f$: longitudinal length of optical fiber; $V_g$: group velocity of laser light in optical fiber; ρ: coefficient of Rayleigh backscattering; Δf: linewidth of laser light; and Δt: delay time of delay circuit and repetition interval for pulse.

The invention claimed is:

1. A distributed fiber optic acoustic detection device that measures a distribution state of an acoustic wave by utilizing backscattered light disturbance due to strain of an optical fiber caused by the acoustic wave, the distributed fiber optic acoustic detection device comprising:
    a laser light source;
    a pulse generator for shaping laser light emitted from the laser light source into an optical pulse, to inject into an optical fiber the optical pulse as a prove optical pulse for acoustic detection;
    a delay circuit for delaying the laser light to be injected into the pulse generator for the pulse generator to inject a delayed optical pulse as a replica optical pulse of the prove optical pulse for acoustic detection;
    a switching circuit for switching injection of the laser light into the pulse generator between directly and via the delay circuit;
    a detector for detecting Rayleigh backscattered light returning to an input end of the optical fiber after backscattered in the optical fiber, to extract an intermediate frequency signal from the detected signal; and
    a signal processor for processing the intermediate frequency signal extracted by the detector to convert the processed signal into a baseband signal,
wherein during acoustic measurement,
the prove optical pulse and the replica optical pulse are repeatedly injected one after another as an odd-numbered prove pulse and an even-numbered prove pulse, respectively, into the optical fiber at constant time intervals by the switching action of the switching circuit, and the signal processor processes the intermediate signal that is obtained by subtracting a Rayleigh backscattered signal responsive to an odd-numbered optical pulse from a Rayleigh backscattered signal responsive to the next even-numbered optical pulse.

2. The distributed fiber optic acoustic detection device of claim 1, further comprising:
    modulator for modulating the optical pulse launched from the pulse generator and
    a demodulator for demodulating Rayleigh backscattered light responsive to the optical pulse modulated by the modulator,
wherein the modulator modulates the optical pulse using a given code sequence to inject the modulated optical pulse into the optical fiber, and the demodulator demodulates Rayleigh backscattered light caused by the modulated optical pulse.

3. The distributed fiber optic acoustic detection device of claim 1, wherein the detector is any one of a polarization diversity heterodyne detector for performing a heterodyne detection using as a reference light a laser light frequency-shifted from the laser light emitted from the laser light source by the frequency shifter, a homodyne detector using as a reference light a frequency-unshifted laser light emitted from the laser light source, and a interferometer configured with m×m optical couplers without using both of the foregoing two kinds of reference light, where m is a natural number of three or more.

4. The distributed fiber optic acoustic detection device of claim 1, wherein the constant time interval is longer than a value calculated by dividing a value twice the length of the optical fiber by a value of a group velocity of the laser light in the optical fiber.

5. The distributed fiber optic acoustic detection device of claim 1, wherein a linewidth of the laser light of the laser light source is 100 kHz or more.

6. The distributed fiber optic acoustic detection device of claim 1, wherein the phase of an output signal of the signal processor is spatially differentiated and the phase is unwrapped into a continuous phase.

* * * * *